United States Patent

Miller et al.

[11] Patent Number: 5,897,667
[45] Date of Patent: Apr. 27, 1999

[54] METHOD AND APPARATUS FOR TRANSFERRING DATA RECEIVED FROM A FIRST BUS IN A NON-BURST MANNER TO A SECOND BUS IN A BURST MANNER

[75] Inventors: Mark W. Miller, Folsom, Calif.; Ali S. Oztaskin, Beaverton, Oreg.

[73] Assignee: Intel Corporation, Santa Clara, Calif.

[21] Appl. No.: 08/755,246

[22] Filed: Nov. 22, 1996

Related U.S. Application Data

[63] Continuation of application No. 08/153,317, Nov. 16, 1993, abandoned.

[51] Int. Cl.[6] .............................. G06F 12/02; G06F 9/26
[52] U.S. Cl. ...................... 711/218; 711/200; 711/202; 711/214; 711/217; 395/306; 395/308
[58] Field of Search .................................... 395/427, 855, 395/853, 306, 309, 308, 200.01, 200.15, 842, 854, 872; 711/200, 202, 214, 217, 218

[56] References Cited

U.S. PATENT DOCUMENTS

| | | | |
|---|---|---|---|
| 3,818,461 | 6/1974 | Ward et al. | 340/172.5 |
| 3,999,168 | 12/1976 | Findley et al. | 395/110 |
| 4,031,519 | 6/1977 | Findley | 395/110 |
| 4,032,899 | 6/1977 | Jenny et al. | 395/311 |
| 4,052,699 | 10/1977 | Micka et al. | 382/297 |
| 4,868,734 | 9/1989 | Idleman et al. | 395/849 |
| 4,965,801 | 10/1990 | Dulac | 371/40.1 |
| 5,075,846 | 12/1991 | Reininger et al. | 364/400 |
| 5,197,144 | 3/1993 | Edenfield et al. | 395/470 |
| 5,239,638 | 8/1993 | Pawlowski et al. | 395/496 |
| 5,241,630 | 8/1993 | Lattin, Jr. et al. | 395/287 |
| 5,269,005 | 12/1993 | Heil et al. | 395/869 |
| 5,289,584 | 2/1994 | Thorne et al. | 395/436 |
| 5,325,499 | 6/1994 | Kummer et al. | 395/499 |
| 5,333,276 | 7/1994 | Solari | 395/287 |
| 5,392,407 | 2/1995 | Heil et al. | 395/293 |
| 5,410,656 | 4/1995 | King et al. | 395/306 |
| 5,448,310 | 9/1995 | Kopet et al. | 348/699 |
| 5,483,640 | 1/1996 | Isfeld et al. | 395/200.03 |
| 5,550,989 | 8/1996 | Santos | 395/306 |
| 5,564,026 | 10/1996 | Amini et al. | 395/308 |

FOREIGN PATENT DOCUMENTS

| | | |
|---|---|---|
| 0 416 281 A2 | 3/1991 | European Pat. Off. . |
| 0 627 688 A1 | 12/1994 | European Pat. Off. . |
| 0 629 956 A2 | 12/1994 | European Pat. Off. . |

OTHER PUBLICATIONS

*i486 Microprocessor Hardware Reference Manual*—Chapter 3: Processor Bus Intel Corporation, Santa Clara, CA, 1990, pp. 3–1 to 3–7 and 3–21 to 3–27.

*PCI Local Bus Specification Revision 2.0: Product Version*, Apr. 30, 1993, pp. 23–24 and 28–30.

*Primary Examiner*—Eddie P. Chan
*Assistant Examiner*—Than V. Nguyen
*Attorney, Agent, or Firm*—Blakely, Sokoloff, Taylor & Zafman

[57] ABSTRACT

A bridge logic takes non-burst write cycles that appear one at a time as an address followed by an associated data word on a first bus, detects consecutive addresses, and uses this information to create burst cycles on a second bus that has protocols that allow burst cycles such as a Peripheral Component Interconnect (PCI) bus.

52 Claims, 3 Drawing Sheets

METHOD AND APPARATUS FOR TRANSFERRING DATA RECEIVED FROM A FIRST BUS IN A NON-BURST MANNER TO A SECOND BUS IN A BURST MANNER

This is a continuation of application Ser. No. 08/153,317, filed Nov. 16, 1993, now abandoned.

CROSS REFERENCE TO RELATED APPLICATIONS

U.S. patent application Ser. No. 886,962, Bridge Buffer Management by Bridge Interception of Synchronization Events, of Young, et al filed May 21, 1992, assigned to Intel Corporation the assignee of the present invention.

BACKGROUND OF THE INVENTION

1. Field of the Invention

The present invention is related to data processing systems and more specifically to a method and apparatus for increasing bandwidth on a computer bus that interfaces with a bus that has data bursting capabilities.

2. Prior Art

A prior art Peripheral Component Interface (PCI) bus protocol provides for burst reads and burst writes to attached devices such as a graphics subsystems, local area network and disk drives. However, Central Processor Units (CPU's) such as the Intel i486™ CPU can only burst reads from a peripheral bus, not writes to a peripheral bus. If a write were to take place with a prior art system over the PCI interface, such as to a frame buffer memory of a graphics display, then it would be necessary to transfer just one data word (DWORD) at a time. This incurs a high overhead, perhaps 6 clock cycles or more of the PCI bus, even if the target device responds with zero wait states.

It is therefore an object of this invention to provide a method and means for transferring sequential non-burst data on a first bus to burst data on a second bus.

SUMMARY OF THE INVENTION

Briefly, the above object is accomplished in accordance with the invention by providing a logic that takes address/data pairs that appear on a host bus, detects consecutive addresses, and uses this information to create burst cycles on a second bus.

An advantage of this invention is that by using posted write buffers in conjunction with the data bursting protocols of the second bus, the host write bandwidth is increased by 200 to 300% over the prior art.

A further advantage of this invention is that the bus performance experienced by the host is the same as if the devices, such as local area networks or graphic devices, are actually wired directly to the host bus.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
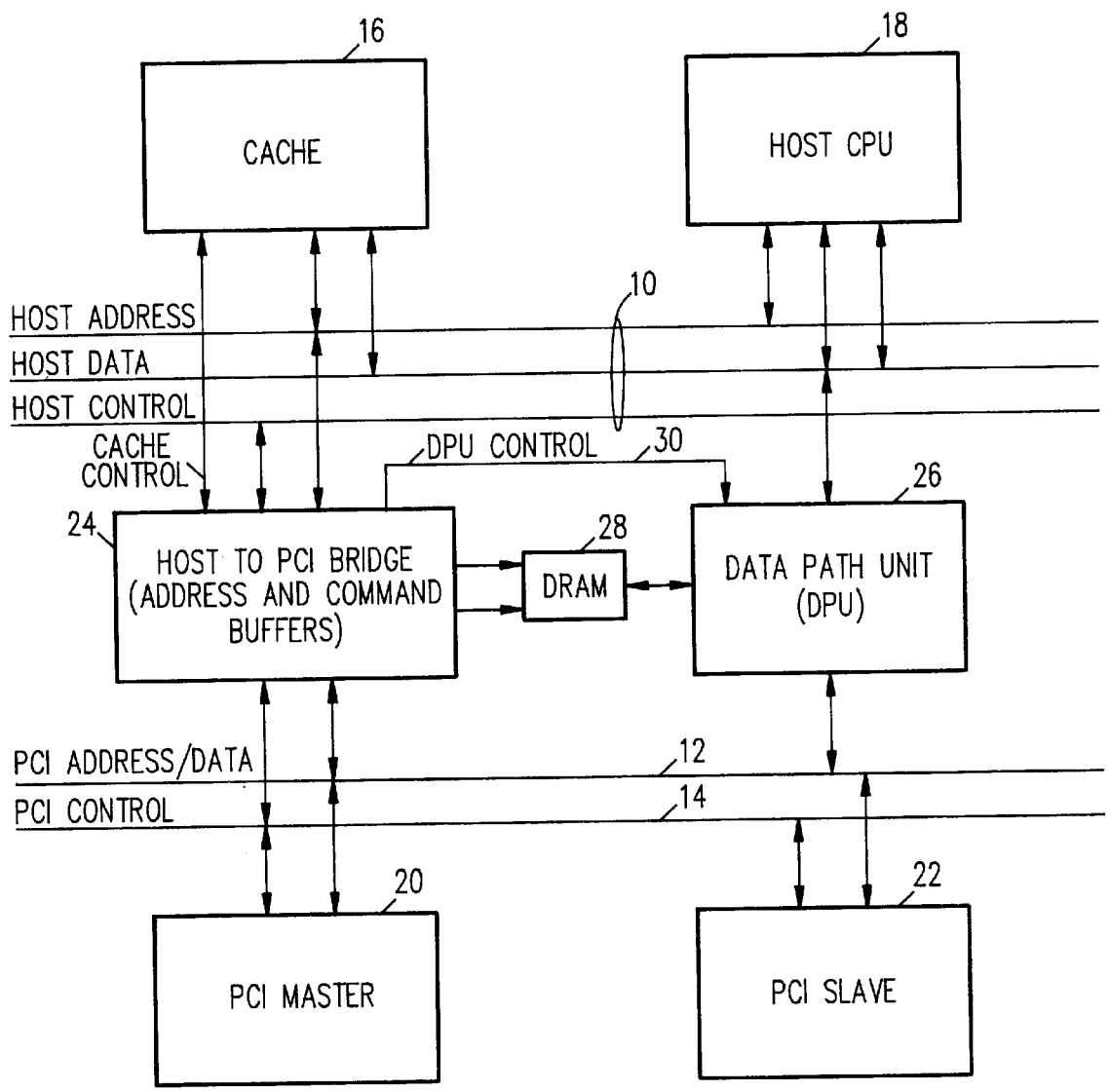
FIG. 1 is a functional block diagram of a data processing system in which the present invention is embodied.

FIG. 1 is a block diagram of a data processing system in which the present invention is embodied. The Peripheral Component Interconnect ( PCI) bus protocol provides for burst reads and burst writes to attached memory devices such as a graphics frame buffer. A first bus (10), the host bus, is comprised of host address (ADDR), host data and host control (command) lines. The host control includes CLK and ADS#. CLK (clock) is the timing reference used by the host CPU. ADS# (address status) is generated by the host CPU and is used to indicate that a new cycle has been started. The host CPU communicates over the host bus (10) with a cache memory (16) by asserting the ADS# signal to initiate a memory access at an address specified by ADDR (host address). RDY# (ready), part of the cache control of FIG. 1, is generated by the cache and indicates that the cache memory is ready. A second bus, the PCI bus (12, 14) is comprised of PCI address/data bus (12) and PCI control bus (14). The PCI address/data bus (12) includes the PCIAD (PCI address) and PCI data. The PCI control includes FRAME# (76), IRDY# (78) and TRDY# (80). A PCI Master (20) and a PCI Slave (22) are connected to the PCI bus.

Since CPU's such as the Intel i486™ CPU can only burst reads from a bus, not writes to a bus, a Host to PCI Bridge logic (24) and a Data Path Unit (DPU-26) are provided and are connected to the PCI bus. A dynamic random access memory (DRAM-28) is provided. The DPU (26) interfaces to both the Host Bus and to the PCI bus providing dual port access to the DRAM.

In the preferred embodiment of the invention, the Host to PCI Bridge provides the address and control bus connections from host bus (10) to DRAM (28), from host bus (10) to PCI bus (12, 14), from PCI bus (12, 14) to DRAM (28) as well as from PCI bus (12, 14) to host bus (10) for cache snoop purposes. Similarly, the Data Path Unit (26) provides the data bus connections from host bus (10) to PCI bus (12), from host bus (10) to DRAM (28), as well as from PCI bus (12) to DRAM (28). For all practical purposes the Host to PCI Bridge (24) and the Data Path Unit (26) act like a single coherent entity, only implemented as two different components due to some practical limits, for example, limits on pin count. The DPU Control Bus (30) ensures coherent operation of these two blocks.

Writes come from the CPU one at time. If writes are to consecutive addresses, these non-burst CPU cycles are converted by the lost to PCI Bridge and DPU into burst writes on the PCI bus to take advantage of the burst write protocol of the PCI bus. In this manner, each consecutive write takes as little as one clock cycle, depending upon any master or target initiated wait states.

CPU Bus to Bridge Interface

Figure 2:
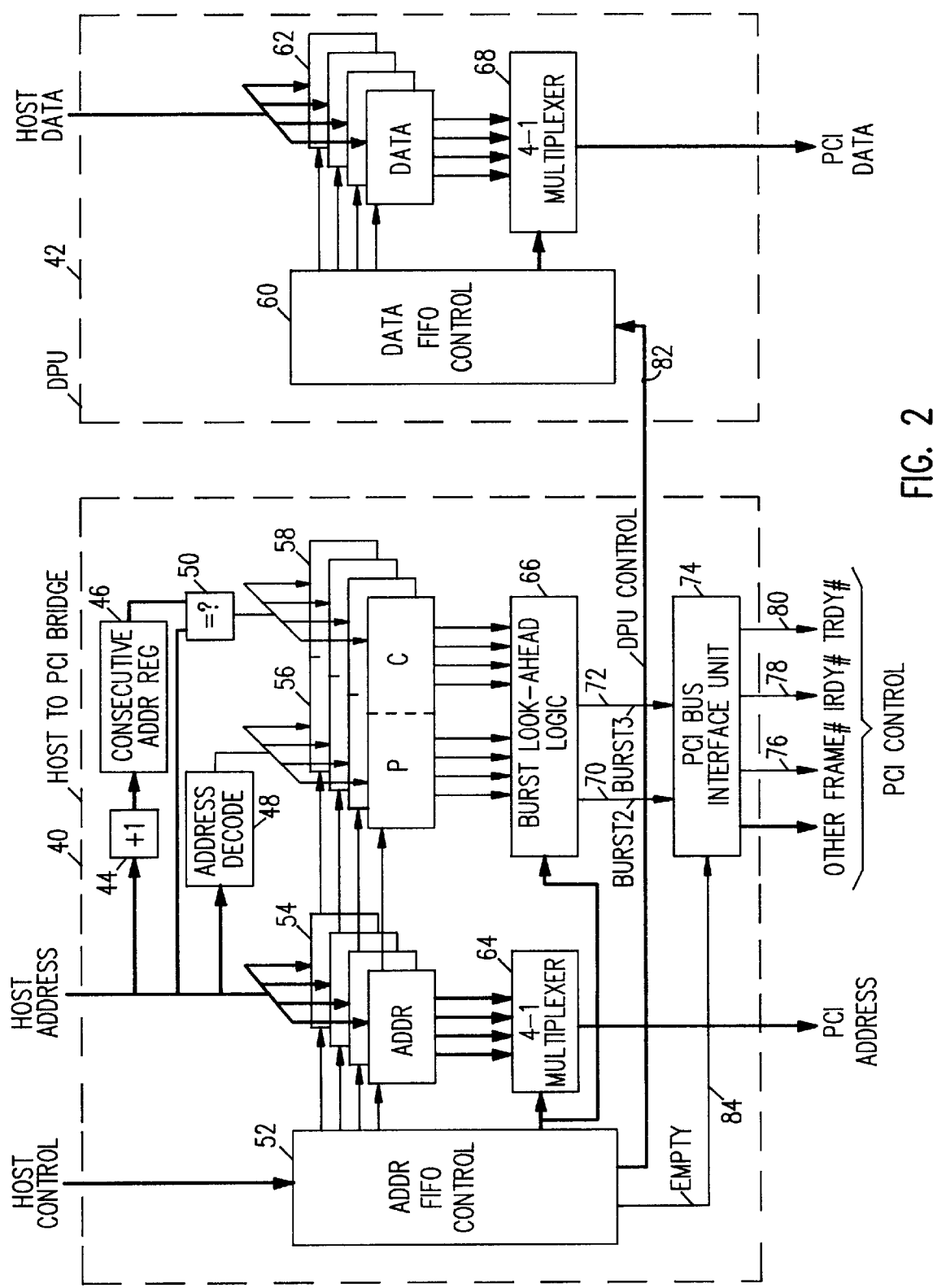
FIG. 2 is a more detailed diagram of the logic within the Host to PCI Bridge and the Data Path Unit shown in FIG. 1; and, FIG. 3 is a timing diagram of the operation of the logic shown in FIG. 1 and FIG. 2.

Refer to FIG. 2. An address first-in first-out (FIFO) buffer (54) in the host to PCI bridge (40) is connected to the host address bus. An address FIFO control logic (52) is connected to the host control bus. The address FIFO control logic (52) controls push and pop operations into one of four posted write buffers. Each posted write buffer stores a 30-bit address (54) and a 32-bit data word (62). Associated with each data/address buffer pair are two flags, a posted flag (P-56) and a consecutive flag (C-58). A data FIFO buffer (62) is located in the Data Path Unit (42) with its own data FIFO control logic (60), however it is linked to the address FIFO control logic (52) through the DPU control bus (82) for coherent operation.

The address FIFO control logic (52) and data FIFO control logic (60) maintain head and tail pointers. The head pointers indicate which one of the four posted write buffer entries is to be popped. Similarly, the tail pointers indicate which one of the four posted write buffer entries is to be used for the push operation. The host address and data buses are connected to the inputs of the address (54) and data (62) portions of the posted write buffers directly.

Also connected to the host address bus is the address decode logic (48). The address decode logic generates the Postable Flag (P). The postable flag is active if the host address is decoded to a postable region of the PCI memory address space. The host address bus is also connected to an increment logic (44). Every time a host cycle is posted to the posted write buffers, the incremented host address is stored in the consecutive address register (46). An equality comparator (50) is used to compare the host address to the contents of the consecutive address register (46), which holds a previously posted address plus one. The output of the equality comparator (50) is the consecutive flag (C). When a host memory write cycle is posted into one of the four posted write buffers, the P (56) and the C (58) flags are also posted along with address (54) and data (62).

Bridge to PCI Bus Interface

Refer to FIG. 2. The head pointers of the address FIFO control logic (52) and the data FIFO control logic (60) are used as selectors to 4-1 multiplexers (64, 68). The burst look-ahead logic (66) also receives the head pointer (h) and calculates the next posted write buffer pointer (h+1) and the one after that (h+2). The burst look-ahead logic (66) generates the BURST2 (70) by AND'ing posted (P) and consecutive (C) flags posted at the next write buffer (h+1). Similarly, the BURST3 (72) signal is generated by AND'ing posted (P) and consecutive (C) flags posted at the second next write buffer (h+2). The BURST2 (70) and BURST3 (72) equations are:

$$BURST2 <= P(h+1) \text{ AND } C(h+1);$$

$$BURST3 <= P(h+2) \text{ AND } C(h+2);$$

where h is the current head pointer.

The PCI bus interface unit (74) monitors the EMPTY (84) signal generated by the address FIFO control logic (52). When the EMPTY (84) signal is sampled inactive, this signals the PCI bus interface unit (74) to begin data transfer to the PCI bus in accordance with the PCI bus protocol described subsequently.

Bus Timings

Figure 3:
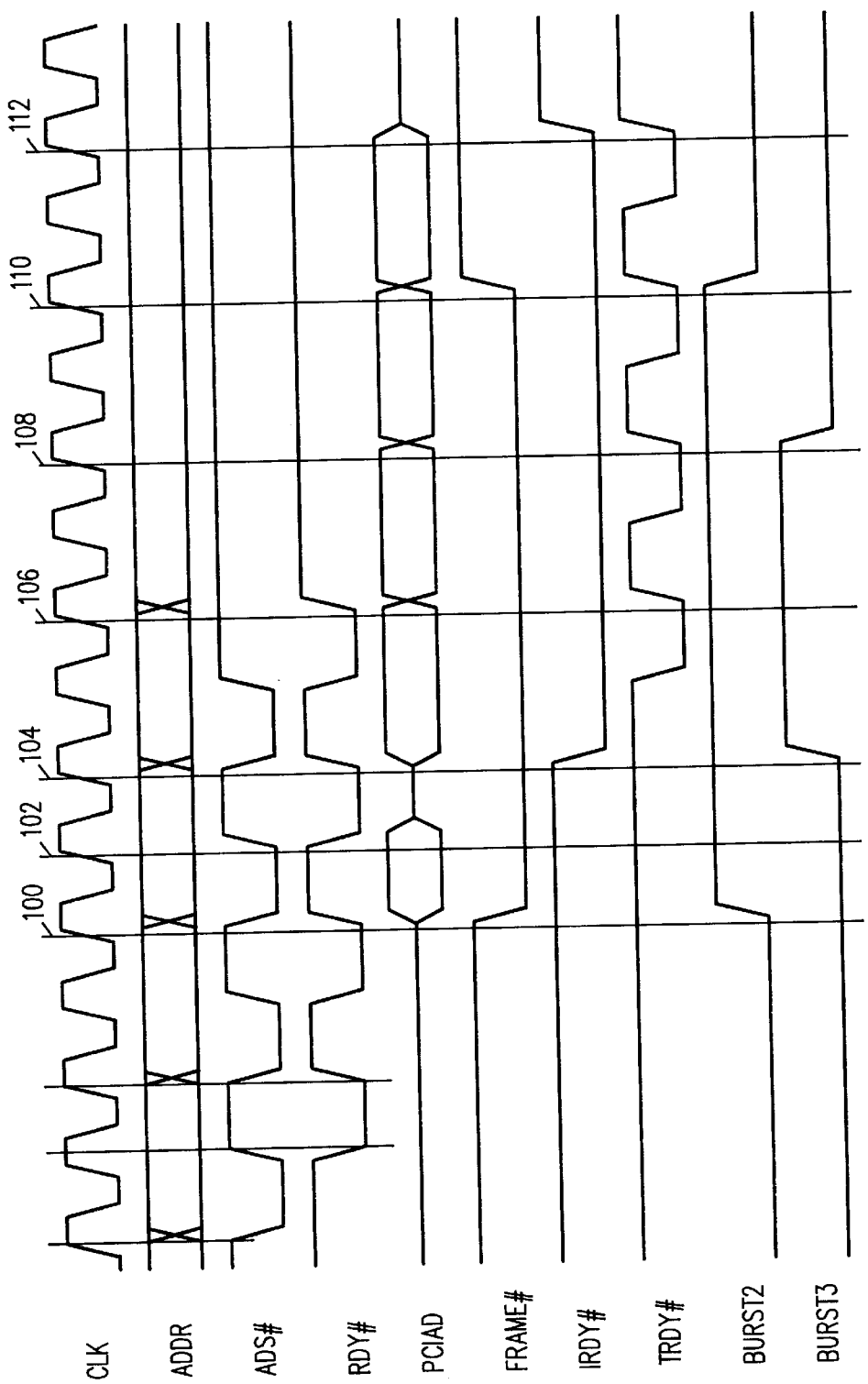

Refer to the timing diagram of FIG. 3. The host bus (10) can be any known data bus protocol wherein an address/data pair is placed on the bus followed by another address/data pair. The addresses may or may not be consecutive. In FIG. 3, a set of four data words having four consecutive addresses are shown. As an address (ADDR) is placed on the address bus, the address status (ADS#) is asserted and the cache responds by asserting ready (RDY#). This protocol will be familiar to those skilled in the art as it is used in the Intel i486™ microprocessors. As each DWORD is transferred, a corresponding posted flag is set. The buffers are filled in a round robin manner. If all posted flags are set, the data posting stops until a buffer pair becomes available.

The PCI bus provides for an initiator (I) to initiate burst writes to a target (T) device. In the write case the initiator is the Host to PCI Bridge. The PCI bus protocol uses the three primary control signals: frame (FRAME#-76), Initiator Ready (IRDY#-78) and Target Ready (TRDY#-80).

The FRAME# signal indicates that a transfer is underway. In the first clock of a transfer, FRAME# asserted signals that an address phase is taking place on the bus. When ready to transfer, the Host to PCI Bridge asserts IRDY#. The host-to-PCI bridge enters a data phase when either IRDY# or TRDY# is asserted. Either the initiator or the target can insert wait states. The FRAME# signal must be deasserted if IRDY# is asserted and there is only one more data phase. For a single data phase, as soon as IRDY# is asserted, the FRAME# signal is deasserted. For a burst cycle, the FRAME# signal must remain asserted as multiple data phases take place. The FRAME# signal has to be deasserted at the point in time where there is only one more data phase.

Once the access to the PCI bus is granted, the PCI address output buffers are turned on and the FRAME# is asserted indicating start of a PCI cycle (100). On the next clock edge (102), the PCI address buffers of the host to PCI bridge are turned off allowing bus turn-around time for PCI's multiplexed address/data bus. On the following clock edge (104), the Data Path Unit PCI data output buffers are enabled, and the IRDY# signal is asserted indicating valid data on PCI address/data bus. Also at this clock edge an important decision is made. If there is one more consecutive data (excluding the one driven on the bus) in the posted write buffers then the FRAME# signal is kept asserted, otherwise the FRAME# signal has to be deasserted. This is where the BURST2 signal is used. In FIG. 3 the BURST2 signal is active at this clock edge indicating availability of at least one more consecutive data in the posted write buffers, hence the FRAME# signal is kept asserted.

Once the target device indicates acceptance of data, it asserts the TRDY# signal. When the host to PCI bridge samples both IRDY# and TRDY# signals active it has to make yet another decision. If there are two more consecutive data (excluding the one already driven to the bus) in the posted write buffers then the FRAME# signal is kept asserted, Otherwise, there is only one more data to transfer, hence the FRAME# signal must be deasserted. This is where the BURST3 signal is used. In FIG. 3 the BURST3 signal is active at clock edges 106 and 108. The FRAME# signal is kept asserted on these clock edges to continue with PCI burst write cycle. However on clock edge 110 the BURST3 signal is inactive, hence the FRAME# signal is deasserted on this clock edge, and transfer of the last consecutive data completed at clock edge 112. At this clock edge the IRDY# is also deasserted indicating completion of the PCI cycle. The posted write buffer entries are popped (discarded) as the PCI data transfers took place (on clock edges 106, 108, 110 and 112).

While the invention has been particularly shown and described with reference to preferred embodiments thereof, it will be understood by those skilled in the art that the foregoing and other changes in form and detail may be made therein without departing from the scope of the invention.

What is claimed is:

1. A system comprising:
   a first bus which supports non-burst write cycles;
   a processor, coupled to the first bus, to place a plurality of non-burst write cycles on the first bus;
   a second bus; and
   a bridge coupled to the first bus and the second bus, wherein the bridge includes,
      a plurality of data buffers to store data from the plurality of non-burst write cycles,
      a comparator to identify two or more write cycles of the plurality of non-burst write cycles which are to consecutive addresses, and
      control logic, coupled to the plurality of data buffers and the comparator, to transfer the data of the two or more writes cycles to the second bus in a burst write cycle.

2. The system of claim 1, wherein the bridge also includes:

a consecutive flag, coupled to the control logic, which corresponds to a first data buffer of the plurality of data buffers and which indicates whether the data in the first data buffer is from a write cycle of the plurality of non-burst write cycles which was sequential to an immediately preceding write cycle of the plurality of non-burst write cycles.

3. The system of claim 2, wherein the first bus includes an address bus, wherein the comparator is coupled to the address bus and to a consecutive address register, and wherein the comparator is to set the consecutive flag responsive to an address on the address bus being equal to an address in the consecutive address register.

4. The system of claim 1, wherein the bridge further includes:

a plurality of address buffers, coupled to the comparator, to store a plurality of addresses corresponding to the plurality of non-burst write cycles, wherein the comparator is to identify the two or more write cycles concurrent with the addresses of the plurality of non-burst write cycles being stored in the plurality of address buffers.

5. The system of claim 1, wherein the bridge further includes a first signal line and a second signal line coupling the comparator and the control logic, wherein assertion of a first signal on the first signal line indicates data from at least one of the two or more write cycles remains in the plurality of data buffers, wherein the comparator is to assert the first signal in response to data from at least one of the two or more write cycles remaining in the plurality of data buffers, wherein assertion of a second signal on the second signal line indicates data from at least two of the two or more write cycles remains in the plurality of data buffers, and wherein the comparator is to assert the second signal in response to data from at least two of the two or more write cycles remaining in the plurality of data buffers.

6. The system of claim 1, wherein the bridge further includes a plurality of posted flags corresponding to the plurality of data buffers, wherein each posted flag indicates whether the data in the corresponding data buffer is from a write cycle of the plurality of non-burst write cycles which is postable.

7. The system of claim 1, wherein the bridge further includes:

a plurality of address buffers, coupled to the comparator, to store each address from the plurality of non-burst write cycles, and wherein at least two of the plurality of non-burst write cycles are to non-sequential addresses.

8. The system of claim 1, wherein the plurality of data buffers comprises four data buffers.

9. The system of claim 1, wherein the plurality of data buffers comprises less than ten thousand data buffers.

10. The system of claim 1, wherein the comparator is implemented in a first chip and the plurality of data buffers are implemented in a second chip which is physically separate from the first chip.

11. The system of claim 1, wherein the comparator includes an incrementer for incrementing an address from the plurality of non-burst write cycles by one.

12. The system of claim 1, wherein the comparator includes equality comparison logic to determine whether an address of a first write cycle of the plurality of non-burst write cycles is sequential to an address of a second write cycle of the plurality of non-burst write cycles.

13. The system of claim 1, wherein the second bus is a Peripheral Component Interconnect (PCI) bus.

14. An apparatus comprising:

first control logic to receive data in a plurality of non-burst write cycles;

a plurality of data buffers, coupled to the first control logic, to store the data;

comparison logic to identify two or more write cycles of the plurality of non-burst write cycles which are to sequential addresses; and second control logic, coupled to the plurality of data buffers, to output the data of the two or more write cycles on a bus in a burst write cycle.

15. The apparatus of claim 14, further comprising:

a plurality of address buffers, coupled to the first control logic, to store a plurality of addresses corresponding to the plurality of non-burst write cycles.

16. The apparatus of claim 14, further comprising:

a consecutive address register to store a previous address received by the first control logic incremented by one; and a comparator, coupled to the consecutive address register, to set a consecutive address flag corresponding to a first address of a plurality of addresses corresponding to the plurality of non-burst write cycles in response to the first address equaling the previous address incremented by one.

17. The apparatus of claim 16, wherein the previous address incremented by one corresponds to an address of the plurality of addresses received immediately previous to the first address.

18. The apparatus of claim 14, further comprising:

a plurality of address buffers, coupled to the first control logic, to store a plurality of addresses corresponding to the plurality of non-burst write cycles, wherein the comparison logic is to identify the two or more write cycles as the addresses of the plurality of non-burst write cycles are stored in the plurality of address buffers.

19. The apparatus of claim 14, further comprising a first signal line and a second signal line coupling the comparison logic and the second control logic, wherein assertion of a first signal on the first signal line indicates data from at least one of the two or more write cycles remains in the plurality of data buffers, wherein the comparison logic is to assert the first signal in response to data from at least one of the two or more write cycles remaining in the plurality of data buffers, wherein assertion of a second signal on the second signal line indicates data from at least two of the two or more write cycles remains in the plurality of data buffers, and wherein the comparison logic is to assert the second signal in response to data from at least two of the two or more write cycles remaining in the plurality of data buffers.

20. The apparatus of claim 14, further comprising a plurality of posted flags corresponding to the plurality of data buffers, wherein each posted flag indicates whether the data in the corresponding data buffer is from a write cycle of the plurality of non-burst write cycles which is postable.

21. The apparatus of claim 14, further comprising a plurality of consecutive flags corresponding to the plurality of data buffers, wherein each consecutive flag indicates whether the data in the corresponding data buffer is from a write cycle of the plurality of non-burst write cycles which was sequential to an immediately preceding write cycle of the plurality of non-burst write cycles.

22. The apparatus of claim 14, wherein the comparison logic is implemented in a first chip and the plurality of data buffers are implemented in a second chip which is physically separate from the first chip.

23. The apparatus of claim 14, wherein the comparison logic includes an incrementer for incrementing an address from the plurality of non-burst write cycles by one.

24. The apparatus of claim 14, wherein the comparison logic includes an equality comparator to determine whether an address of a first write cycle of the plurality of non-burst write cycles is sequential to an address of a second write cycle of the plurality of non-burst write cycles.

25. The apparatus of claim 14, wherein the plurality of data buffers comprises four data buffers.

26. The apparatus of claim 14, wherein the plurality of data buffers comprises less than ten thousand data buffers.

27. The apparatus of claim 14, further comprising a plurality of address buffers, coupled to the comparison logic, to store each address from the plurality of non-burst write cycles, and wherein at least two of the plurality of non-burst write cycles are to non-sequential addresses.

28. A method comprising the steps of:
receiving a plurality of address/data pairs from a first bus, wherein each of the address/data pairs appears on the first bus in a non-burst manner;
detecting two address/data pairs of the plurality of address/data pairs which have sequential addresses; and
transferring the data of the two address/data pairs to a second bus in a burst write manner.

29. A bus bridge comprising:
a plurality of data buffers to store data received from a first bus as part of a plurality of non-burst write cycles, wherein each of the plurality of non-burst write cycles appears on the first bus in a non-burst manner as an address and an associated data word;
comparison logic to detect two consecutive addresses from the plurality of non-burst write cycles; and
a Peripheral Component Interconnect (PCI) bus interface, coupled to the plurality of data buffers and to the comparison logic, to transfer the data words associated with the two consecutive addresses to a PCI bus as a burst write cycle.

30. The bus bridge of claim 29, further comprising:
a plurality of address buffers to store the addresses from the plurality of non-burst write cycles.

31. The bus bridge of claim 30, further comprising:
an increment logic to generate, upon receipt of a first address from the first bus, a consecutive address value; and
an equality comparator to compare a second address received from the first bus to the consecutive address value, and to set a consecutive flag, corresponding to the second address, indicating that the first and second addresses are consecutive, responsive to the second address equaling the consecutive address value.

32. A method comprising the steps of:
receiving a plurality of non-burst address/data pairs from a first bus;
detecting two or more address/data pairs of the plurality of non-burst address/data pairs which have consecutive addresses; and
transferring the data of the two or more address/data pairs to a second bus in a burst write cycle.

33. The method of claim 32, wherein the step of transferring the data of the two or more address/data pairs comprises the step of transferring the data of the two or more address/data pairs to the second bus responsive to a buffer empty signal being sampled inactive.

34. The method of claim 32, further comprising the step of:
storing the data of each of the plurality of non-burst address/data pairs.

35. The method of claim 32, wherein the step of detecting the two or more address/data pairs includes the steps of:
generating a consecutive address value based on a first non-burst address/data pair received from the first bus;
receiving a second non-burst address/data pair from the first bus;
comparing the address of the second non-burst address/data pair to the consecutive address value; and
setting a consecutive flag indicating whether the address of the second non-burst address/data pair is the same as the consecutive address value.

36. The method of claim 32, further comprising the steps of:
identifying whether data from at least one of the two or more address/data pairs is remaining to be transferred to the second bus;
identifying whether data from at least two of the two or more address/data pairs is remaining to be transferred to the second bus; and
providing at least one signal on the second bus based on whether at least one of the two or more address/data pairs is remaining to be transferred to the second bus and on whether at least two of the two or more address/data pairs is remaining to be transferred to the second bus.

37. The method of claim 32, further comprising the step of setting a posted flag corresponding to an address of one of the plurality of non-burst address/data pairs in response to the one address/data pair being postable.

38. The method of claim 32, further comprising the step of setting a consecutive flag corresponding to one of the plurality of non-burst address/data pairs in response to the address of the one address/data pair being sequential to an immediately preceding address/data pair of the plurality of non-burst address/data pairs.

39. The method of claim 32, further comprising the step of storing each address of the plurality of non-burst address/data pairs, wherein at least two of the plurality of non-burst address/data pairs are to non-consecutive addresses.

40. The method of claim 32, further comprising the step of placing the plurality of non-burst address/data pairs into a plurality of address buffers upon receiving the plurality of non-burst address/data pairs from the first bus, wherein the step of detecting two or more address/data pairs comprises the step of detecting the two or more address/data pairs which have consecutive addresses as the plurality of non-burst address/data pairs are placed into the plurality of address buffers.

41. The method of claim 32, further comprising the step of storing data of the plurality of non-burst address/data pairs in a plurality of data buffers, wherein the step of storing data in the plurality of data buffers occurs on a first chip and the step of detecting the two or more address/data pairs occurs on a second chip which is physically separate from the first chip.

42. The method of claim 32, wherein the step of detecting the two or more address/data pairs includes the step of incrementing the address of one of the plurality of address/data pairs by one.

43. The method of claim 32, wherein the step of detecting the two or more address/data pairs includes the step of using an equality comparator to determine whether an address of a first address/data pair is sequential to an address of a second address/data pair.

44. The method of claim 32, further comprising the step of storing the data of each of the plurality of non-burst address/data pairs in one of four data buffers.

45. The method of claim 32, further comprising the step of storing the data of each of the plurality of non-burst address/data pairs in one of at least ten thousand data buffers.

46. An apparatus comprising:
   means for receiving a plurality of non-burst address/data pairs from a first bus;
   means for detecting two or more address/data pairs of the plurality of non-burst address/data pairs which have consecutive addresses; and
   means for transferring the data of the two or more address/data pairs to a second bus in a burst write cycle.

47. The apparatus of claim 46, wherein the means for transferring comprises means for transferring the data of the two or more address/data pairs to the second bus responsive to a buffer empty signal being sampled inactive.

48. The apparatus of claim 46, further comprising:
   means for storing the data of each of the plurality of non-burst address/data pairs.

49. The apparatus of claim 48, wherein the means for detecting includes:
   means for generating a consecutive address value based on a first non-burst address/data pair received from the first bus;
   means for receiving a second non-burst address/data pair from the first bus;
   means for comparing the address of the second non-burst address/data pair to the consecutive address value; and
   means for setting a consecutive flag corresponding to the second non-burst address/data pair responsive to the means for comparing indicating the address of the second non-burst address/data pair is the same as the consecutive address value.

50. In a bus bridge coupled to a first bus and a Peripheral Component Interconnect (PCI) bus, wherein the bus bridge includes a plurality of data buffers and control logic to transfer data from the plurality of data buffers to the PCI bus, a method comprising the steps of:
   receiving a plurality of address/data pairs from the first bus in a non-burst manner;
   detecting two or more address/data pairs of the plurality of address/data pairs which have sequential addresses;
   storing the data of the two or more address/data pairs in the plurality of data buffers; and
   transferring the data of the two or more address/data pairs to the PCI bus in a burst write manner.

51. The method of claim 50, wherein the step of transferring the data of the two or more address/data pairs comprises the step of bursting the data of the two or more address/data pairs to a target agent coupled to the PCI bus.

52. The method of claim 50, wherein the step of detecting the two or more address/data pairs includes the steps of:
   generating a consecutive address value based on a first address/data pair of the plurality of address/data pairs;
   receiving a second address/data pair from the first bus;
   comparing the address of the second address/data pair to the consecutive address value; and
   setting a consecutive flag corresponding to the address of the second address/data pair responsive to the comparing indicating the address of the second address/data pair is the same as the consecutive address value.

* * * * *

UNITED STATES PATENT AND TRADEMARK OFFICE
CERTIFICATE OF CORRECTION

PATENT NO.   : 5,897,667
DATED        : April 27, 1999
INVENTOR(S)  : Miller et al.

It is certified that error appears in the above-identified patent and that said Letters Patent is hereby corrected as shown below:

Column 2,
Line 47, delete "lost" and insert -- Host --.

Signed and Sealed this

Twenty-fifth Day of November, 2003

JAMES E. ROGAN
*Director of the United States Patent and Trademark Office*